United States Patent [19]

Boyd et al.

[11] Patent Number: 5,076,839

[45] Date of Patent: Dec. 31, 1991

[54] PRECIOUS METAL REFINING WITH FLUORINE GAS

[75] Inventors: David A. Boyd, Reading; John H. Holloway, Leicester; Gillian Stanger, West Drayton, all of United Kingdom

[73] Assignee: Johnson Matthey Public Limited Company, London, England

[21] Appl. No.: 536,995

[22] Filed: Jun. 12, 1990

Related U.S. Application Data

[63] Continuation of Ser. No. 310,341, Feb. 14, 1989, abandoned.

[30] Foreign Application Priority Data

Feb. 17, 1988 [GB] United Kingdom ................ 8803707

[51] Int. Cl.$^5$ .............................................. C22B 11/00
[52] U.S. Cl. ........................................ 75/631; 75/633; 423/22; 423/489
[58] Field of Search ................ 423/22, 464, 489; 75/631, 633

[56] References Cited

U.S. PATENT DOCUMENTS

| | | | |
|---|---|---|---|
| 3,785,996 | 1/1974 | Hayes | 252/415 |
| 3,929,601 | 12/1975 | Asprey et al. | 204/157 |
| 3,969,267 | 7/1976 | McVicker | 423/489 |
| 4,072,508 | 2/1978 | Vodicka et al. | 423/22 |
| 4,077,800 | 3/1978 | Peka et al. | 423/22 |

OTHER PUBLICATIONS

Hampel *Rare Metals Handbook*, 1961, pp. 327-328.
Sakurai et al., *J. of Inorg. Nucl. Chem.*, 39(3):427 (1977).
Paine et al., *Inorganic Chemistry*, 14(5):1111-1113 (1975).
Chemical Abstracts, vol. 98, No. 6, 1983, p. 698, Abstract No. 45733f.
Chemical Abstracts, vol. 94, No. 20, 1981, p. 687, Abstract No. 166838v.
Chemical Abstracts, vol. 92, No. 24, 1980, p. 676, Abstract No. 208098v.
*Gmelins Handbuch der Anorganischen Chemie*, Edition 8, 1938, p. 63; p. 36 (1938); pp. 68-73 (1982); pp. 270-271 (1942); pp. 50-51 (1939); pp. 97-103 (1978); and p. 58 (1939).

*Primary Examiner*—Melvyn J. Andrews
*Attorney, Agent, or Firm*—Cushman, Darby & Cushman

[57] ABSTRACT

Feed mixtures containing one or more platinum group metals are fluorinated to form at least one volatile fluoride product which is separated from the residual solid. Separations of different fluorides may be effected by collecting different fractions of volatile fluorides. Palladium does not form a volatile fluoride and is retained in the residual solid.

12 Claims, No Drawings

PRECIOUS METAL REFINING WITH FLUORINE GAS

This is a continuation of application Ser. No. 07/310,341, filed on Feb. 14, 1989, which was abandoned upon the filing hereof.

This invention concerns precious metal refining. More especially it concerns the refining of platinum group metals (often termed "PGM"s).

The commercial scale refining of mixtures of platinum group metals involves the formation of metal concentrates and their separation and refining using hydrometallurgical processes. These processes have been developed considerably, but suffer from three major economic drawbacks, (i) incomplete recovery of metal, (ii) long processing times and (iii) considerable labour costs. Despite these drawbacks, no feasible alternative has been proposed.

It is known to enrich the isotopes of uranium for nuclear fuel enrichment by gas-phase diffusion or centrifugation of uranium hexafluoride. In these processes uranium dioxide is converted to uranium tetrafluoride by reaction with hydrofluoric acid, and the tetrafluoride is converted to the hexafluoride by reaction with elemental fluorine or chlorine trifluoride. It has been suggested that plutonium may be purified by a process involving treating $PuF_4$ having impurities of $RuF_5$, $RuF_4$ and $RuOF_4$ with water or steam to hydrolyse the ruthenium compounds (JP 55020266 —Japanese Atomic Energy Research). The U.S. Energy R&D Administration have also suggested (U.S. Pat. No. 3,929,601) that the pentafluorides of Mo, Re, Os or Ir may be obtained by reacting the hexafluorides with one equivalent of hydrogen under UV radiation at room temperature for one day, and that the rate of reaction may be increased by the presence of platinum gauze. It has also been suggested by Vysoka Skola Chem - Techn that the minor amounts of platinum may be recovered from spent platinum on alumina catalysts by fluorination, recovery of a platinum fluoride and conversion of this to platinum metal (GB 1,511,798), but this process has not, apparently, ever been commercialised. U.S. Pat. No. 4,072,508 in the same name discloses a method of recovering the minor proportion of palladium from a spent palladium catalyst. The method involves fluorinating the catalyst, or a residue after ashing the catalyst, in order to decompose carbides and silicates, then treating the residue with a mineral acid. We do not believe that this process has been successfully commercialised.

The present invention provides a method of separating one or more platinum group metals from a feed mixture containing at least 10% by wt, preferably at least 20% by wt, of the metal(s) in free or combined form, comprising treating the feed mixture with fluorine gas under conditions such that at least one volatile fluoride product is formed and separating the volatile fluoride product from the residual solid.

The invention also provides a modification of the process comprising admixing the feed mixture with a depassivating material to form a depassivated feedstock, treating the depassivated feedstock with fluorine gas under conditions such that at least one volatile fluoride product is formed and separating the volatile fluoride product from the residual solid. It will be appreciated that such a modification may be necessary where the feed mixture contains components which passivate or interfere with the formation of readily volatile fluorides which would be expected to be formed from the other components of the feed mixture, and that such additions may result in a feedstock in which the PGM's form a minor proportion.

Preferably, if the feed mixture is in the form of fine metallic powder or a sponge, it has been previously dried and reduced, for example using hydrogen, so that the platinum group metals are present in metallic form. Desirably, air and moisture are excluded after reduction and before fluorination, and it will be appreciated that all hydrogen should be removed from the apparatus before fluorine is admitted. Other feedstocks such as platinum group metal chlorides and low surface area alloys may not generally require hydrogen reduction.

Although the method may be carried out as a batch process, it has been found that better conversion to volatile fluoride products is obtained using a process involving the continuous or semi-continuous passage of fluorine gas over the feed mixture. Accordingly, the method is preferably effected on a continuous or semi-continuous basis, and may be carried out using a static, moving or fluidised bed of feed mixture.

We have found that palladium does not readily form a volatile fluoride and hence, if the feed mixture contains palladium, this will be retained in the residual solid and may be separated therefrom using conventional technology. Osmium, iridium, ruthenium, platinum and rhodium all form volatile fluorides and these therefore offer separation possibilities. Other metals, such as copper, nickel, iron, gold, lead, aluminum etc., do not readily form easily volatile fluorides. Certain other metals or elements form easily volatilised fluorides, examples of the latter being arsenic, antimony, selenium, tellurium, sulphur and tin.

Separation of volatile fluorides may be carried out utilising the differences in the physical properties of the fluorides, especially vapour pressure, boiling point or density, and it may be necessary to use a multiplicity of stages. Multiple stage diffusion and/or centrifugation may also be considered. Alternatively, enhanced or easier separation may be achieved by effecting some chemical change to one or more of the fluorides to enhance the physical differences.

It will be borne in mind that fluorine and the fluorides are extremely hazardous to life and corrosive to much equipment and it is essential to take every safety precaution and to select only equipment which is resistant to attack if this is to be in contact with the reactants or products.

A suitable feed mixture for the method of the invention is a concentrate containing the platinum group metals. The concentrate may be in the form of a mixture consisting essentially of the platinum group metals, or may include impurity metals or compounds. Other feed mixtures to be considered are those containing one or more platinum group metals, in association with impurities, for example, refinery residue, refinery concentrates, spent, waste or scrap customer materials or products, catalyst materials and catalyst recovery materials, electronics materials, materials of nuclear origin or pyrometallurgical products arising from the general or specific smelting of all or any of the aforementioned or like materials. If the feed mixture contains metals which passivate with fluorine, such as copper, nickel and palladium, and therefore interfere with the formation of volatile fluorides, it will generally prove necessary to pretreat the feed in such a way as to remove the adverse effect of these metals or to add to the feed a depassivating material. It will be understood that the invention does not extend to the processing of palladium solely in admixture with materials which do not form readily volatile fluorides.

The temperature used to form the volatile fluorides of the platinum group metals is suitably in the range 300° to 800° C., preferably in the range 350° to 600° C. Although the method may be carried out at fluorine pressures above atmospheric, it is preferred to use fluorine pressures at or below atmospheric, suitably from 100 to 760 mm Hg, and fluorine pressures of 250 to 760 mm Hg have been used in tests. A diluent gas or gases, such as nitrogen or another gas inert under the reaction conditions, may be used in admixture with the gaseous fluorine.

Contact times for the feed mixture will vary according to the other conditions chosen, but the conditions preferred for the experimental work are suitably 0.5 to 3 hours, at a gasflow rate in the range 4.4 to 4.6 l/hr, for a $F_2:N_2$ ratio of 1:2 by volume. It will be appreciated that time and flow rates are chosen depending upon quantities of starting material and, in general, the longer the contact time the lower the flow rate required.

Initial tests were directed to producing the fluorides of individual metals and identifying the species formed, by infra red spectroscopy and mass spectrometry. $RuF_6$ and $RhF_6$ were found to be the least stable and hence mass spectrometry and other forms of spectroscopy frequently proved difficult. For the fluorination of single metal samples, a batch method was compared with a prototype continuous method in which the metal sample in a boat was treated with a $N_2/F_2$ mixture under the conditions stated below. The results for the individual platinum group metals are summarised in Table 1 below.

TABLE 1

| Metal | Batch Method (4–10 atm $F_2$, ca 300° C., 4–5 hrs) | Continuous Method (1 atm $F_2$, 400° C., 0.5–3 hrs) |
|---|---|---|
| Os | approx 95% volatile $OsF_6$ | Complete volatilisation, mainly $OsF_6$ |
| Ir | approx 85% volatile $IrF_6$ | Complete volatilisation, mainly $IrF_6$ |
| Ru | approx 95% volatile $RuF_5$ | Complete volatilisation, $RuF_5/RuF_6$ |
| Pt | approx 2% volatile $PtF_6$ | Complete volatilisation, $PtF_4$, $PtF_5$, $PtF_6$ |
| Rh | approx 20% volatile $RhF_5$ | 70% volatilisation, $RhF_5/RhF_6$ |
| Pd | no volatiles | no volatiles |

It can be seen that the continuous method offers significantly improved results under the chosen conditions over the batch method, and hence was selected for further studies. It should be noted that prior academic work suggested that for $PtF_6$, $RuF_6$ and $RhF_6$ the only effective preparative method involved combustion of the metal in a fluorine atmosphere with the immediate stabilisation of the product on an adjacent surface cooled by liquid nitrogen or, for $PtF_6$, combustion of the metal in very high pressures of fluorine (e.g. 210 atm). It has now been discovered that the continuous method offers the possibility to prepare and stabilise in the gas phase certain fluorides which were reported to be difficult to prepare and were unstable, and hence the present invention permits the unexpected industrial application of gas phase separation of the platinum group metal fluorides.

As will be shown in the Examples hereinafter, the presence in the feed mixture of materials such as palladium, copper and nickel passivate the feed mixture to fluorination and/or the formation of readily volatile fluorides. According to the modification of the invention, a depassivating material may be added. Preliminary tests have shown some success with the use of an alloying component such as bismuth, or, preferably, antimony, which itself forms a transient liquid fluoride under the process conditions. It is also within the scope of the present invention to use as the depassivating material an addition of a further PGM or an increase in the amount of a PGM already present in the feed mixture. Other materials may be used according to the specific feed mixture to be fluorinated, without departing from the scope of the present invention. In some cases, processing conditions, or the addition of a further component, may be used to form metallurgically discrete phases which may decrease the passivating effect of an existing feed mixture component.

The present invention will now be illustrated by the following examples.

EXAMPLE 1

A mixture of platinum group metal sponges was prepared by mixing the metals in the approximate proportions found in commercial secondary refining and grinding the product. A 1.5 g sample of the ground product was placed in a nickel boat. The boat was placed in a pre-fluorinated copper reactor, the apparatus and the sample were dried by heating under vacuum and subsequent flushing with dry nitrogen for 3 hr at approx 80° C. Elemental hydrogen at 760 mm Hg pressure was introduced into the reactor and the metal was heated to 400° C. in the presence of the hydrogen. After cooling, the hydrogen was removed by flushing with nitrogen overnight. A mixture of fluorine and nitrogen was passed over the boat at a fluorine partial pressure of approx 250 mm Hg and a nitrogen pressure of 510 mm Hg, and at a flow rate of 4.5 l/hr. The boat was heated to 400° C. for 2 hours, and the products were collected in three cooled quartz traps. Analysis of the products collected in the traps, the residue in the boat and a quantity of material collected in the neck of the reactor was carried out, and is tabulated below as percentage deportments.

TABLE 2

|  | Pt | Pd | Rh | Ru | Ir | Os |
|---|---|---|---|---|---|---|
| Feed Mixture | 100 | 100 | 100 | 100 | 100 | 100 |
| Boat Residue | 4.8 | 99.95 | 9.2 | 1.6 | 1.1 | 2.1 |
| Reactor neck | 2.8 | 0.004 | 26.8 | 7.7 | 0.78 | 1.26 |
| Trap 1 (0° C.) | 21.1 | 0.02 | 34.2 | 37.5 | 0.67 | 0.21 |
| Trap 2 (−78° C.) | 57.4 | 0.02 | 18.8 | 31.1 | 57.3 | 47.1 |
| Trap 3 (−186° C.) | 13.9 | 0.02 | 11.0 | 22.2 | 40.1 | 49.4 |

These results demonstrate that even at the elementary separation available using cooled traps, the metals are being separated from the vapour phase, and more efficient separation may be predicted with further development.

EXAMPLE 2

Alloys 1–4 were prepared to simulate possible refinery feedstocks for the process of the invention, by melting the elements. Samples of the alloys were fluorinated at 500°-600° C. as generally described in Example 1 above, and the results are summarised in Table 3 below.

TABLE 3

|    | Alloy 1 | | Alloy 2 | | Alloy 3 | | Alloy 4 | |
| --- | --- | --- | --- | --- | --- | --- | --- | --- |
|    | % w/w Comp. | % w/w Volat. | % w/w Comp. | % w/w Volat. | % w/w Comp. | % w/w Volat. | % w/w Comp. | % w/w Volat. |
| Ru | 10 | >99.5 | 8 | 31.1 | 6.4 | 43.8 | 5.5 |      |
| Os | 10 | >99.5 | 8 | NA | 6.4 | NA | 5.5 |      |
| Rh | 15 | >95 | 12 | 22.8 | 9.6 | 12.5 | 8.3 | low |
| Ir | 15 | >99.8 | 12 | 46.3 | 9.6 | 38.6 | 8.3 |      |
| Pd | — | — | 20 | −2.27 | 16 | −7.1 | — | — |
| Pt | 50 | >99.9 | 40 | 22.6 | 32 | 1.8 | 27.6 |     |
| Ni | — | — | — | — | 10 | 2.9 | 24.8 | low |
| Cu | — | — | — | — | 10 | −0.3 | 19.8 |     |

(NA = Not Available; Comp. = Composition; Volat. = volatilisation)

It will readily be seen that there is a significant passivation in the presence of species which do not form volatile fluorides, namely copper, nickel and palladium, compared to the efficient volatilisation of the other five platinum group metals in alloyed combination. Such alloys may occur in commercial residues or be derived from the pyrometallurgical smelting of residue mixtures; Pt/Rh mixtures are an example of alloys met with in commercial practice.

EXAMPLE 3

Single PGM chlorides and binary mixtures of such chlorides with $PdCl_2$ were prepared to simulate the conventional dissolution of PGM feeds in aqueous chloride media, and, after evaporating the solution, the resulting salts were used in the fluorination process. The results are presented in Table 4 below.

TABLE 4

| Single PGM Chlorides | | PGM Chlorides mixed with $PdCl_2$ | |
| --- | --- | --- | --- |
| PGM | (w/w %) volatised | PGM | (w/w %) volatised |
| Ru | >97 | Pd/Ru | Ru >99.5 |
| Ir | >99 | Pd/Ir | Ir 96.8 |
| Rh | NA | Pd/Rh | Rh 16.9 |
| Pt | >99 | Pd/Pt | Pt 11.9 |
|    |    | (Pd: PGM = 1:1 w/w in feeds) | |
|    |    | (Pd volatilisation <1% w/w) | |

Single PGM chlorides exhibited good volatility, but where the particular PGM fluoride was less readily volatised (Rh) or formed a complex fluoride with Pd (e.g. PdII [PtIVF$_6$]), the passivating effect of palladium was still observed. Additional tests with alkali metal PGM chlorides gave relatively low volatilisation of fluorides, which was worsened in admixture with alkali metal Pd chloride; such salts are therefore preferably not used as feedstocks in the process of the invention.

EXAMPLE 4

A series of alloys were prepared to study the addition of a depassivating material, and samples were fluorinated generally as described in Example 1. The results are summarised in Table 5 below.

TABLE 5

| Alloy | Ratio in feed | Ratio in fluorination Residue | |
| --- | --- | --- | --- |
|       |               |               | % Pt volatised |
| Pd/Pt | 1:1 | 1.04:1 | Ca.5 |
| Pd/Pt/Sb | 1:1:2 | 1.25:1:0.013 | 33.6 |
|       |       |              | (% Sb = 99.6) |

TABLE 5-continued

| Alloy | Ratio in feed | Ratio in fluorination Residue | |
| --- | --- | --- | --- |
| Pt/Bi | 1:1 | 1.97:1 | 8 |
| Pd/Pt/Bi | 1:1:2 | 1.16:1:0.63 | 14 |
|       |       |              | % Ir volatised |
| Pd/Ir | 1:1 | 1.28:1 | <35% |
| Pd/Ir/Sb | 1:1:2 | 139.3:1:4.9 | 99.3 |
|       |       |              | (Sb % = 98.3) |
| Pd/Ir/Bi | 1:1:2 | 12.35:1:0.81 | 91.9 |
|       |       |              | (Bi % = 38.4) |
|       |       |              | % Ir volatised |
| Ir | — | — | >99 |
| Ir/Sb | 1:4 | — | >99.8 |
|       |       |              | (Sb = 99.6%) |

It will be observed that significant depassivation of Pd/Pt alloys, and almost complete depassivation of Pd/Ir alloys was achieved by the addition of antimony. Bismuth is shown to be a useful addition to Pd/Ir alloys but had a less marked effect on Pd/Pt.

In the case of iridium, the addition of antimony resulted in the fluorination reaction advantageously beginning at about 100° C. instead of at about 300° C. in the case of hydrogen reduced iridium sponge.

EXAMPLE 5

As can be seen from Table 1, rhodium is the least susceptible PGM (apart from palladium) to forming volatile fluorides. Tests were carried out to compare rhodium sponge with rhodium alloyed with other PGMs, under differing conditions, and the results are presented in Table 6 below.

TABLE 6

| Feed Material | Conditions for Fluorination | % Rh volatised |
| --- | --- | --- |
| $H_2$ reduced Rh sponge | 500° C. for 15 hours | 70-80% |
| Alloy 1 (Table 3) (Pt—Rh—Ru—Ir—Os) | up to 500° C. over 90 minutes | >95% |
| 13% Rh/Pt | up to 600° C. over 77 minutes | 76% (Pt = 99.2%) |

It is seen that alloying Rh with PGMs which more easily form volatile fluorides appears to at least improve the fluorination kinetics.

COMPARATIVE TESTS

Samples of spent reforming catalyst, containing by wt 0.27% Pt and 0.31% Re on alumina, and spent automobile catalyst, containing 0.17% Pt and 0.03% Rh on cordierite ($MgO-SiO_2-Al_2O_3$) were fluorinated as described in Example 1. The analysis of the residue for platinum and rhenium gave % w/w of volatilisation as follows:

|  | Pt | Re | Rh |
|---|---|---|---|
| Spent reforming catalyst | −14.4 | 57.3 | NA |
| Spent autocatalyst | −8.7 | — | NA |

No platinum appears to have been volatilised, and although the rhenium recovery is 50–60%, it is thought that this method is unlikely to be economically attractive for Re. It is therefore considered that the teaching of Vysoka Skola Chem-Techn in GB 1,511,798 has not been confirmed. Moreover, it is our belief that the capital and process costs in attempting to fluorinate a PGM present in amounts of a few percent or less on catalyst support materials will never lead to an economic process.

We claim:

1. A method of separating one or more platinum group metals selected from the group consisting of platinum, rhodium, ruthenium, iridium and osmium from a feed mixture containing at least 10% by weight of an alloy or mixture of two or more metals in free or combined form selected from the group consisting of platinum, palladium, rhodium, ruthenium, iridium and osmium, comprising treating the feed mixture with fluorine gas at a temperature of 350° to 600° C. under conditions such that at least one volatile fluoride of said platinum group metal is formed, and separating the volatile fluoride product in the gas phase from the residual solid.

2. A method as claimed in claim 1, wherein the feed mixture is reduced so that the platinum group metals are in metallic form, before treatment with fluorine.

3. A method as claimed in claim 2, wherein the reduction is effected by hydrogen.

4. A method as claimed in claim 1, wherein the fluorine treatment is carried out by the continuous or semi-continuous passage of fluorine gas over the feed mixture.

5. A method as claimed in claim 1, wherein a mixture of fluorine and a gas inert under the reaction conditions is used.

6. A method as claimed in claim 5, wherein a mixture of fluorine and nitrogen is used.

7. A method as claimed in claim 1, wherein the pressure of fluorine is at or below atmospheric.

8. A method as claimed in claim 1, wherein a mixture consisting essentially of platinum group metals is treated, and separate fractions of different volatile platinum group fluoride products, are collected.

9. A modification of the method of claim 1 comprising admixing the feed mixture with a depassivating material to form a depassivated feedstock, treating said feedstock with fluorine gas under conditions such that at least one volatile fluoride product is formed, and separating the volatile fluoride product from residual solid.

10. The method of claim 9, wherein the depassivating material is a substance which is capable of forming a transient liquid fluoride under the process conditions.

11. The method of claim 9, wherein the depassivating material is a metal selected from bismuth and antimony.

12. The method of claim 9, wherein the depassivating material is a platinum group metal.

* * * * *